United States Patent [19]

Gold et al.

[11] Patent Number: 4,842,355
[45] Date of Patent: Jun. 27, 1989

[54] MULTICHANNEL OPTICAL ROTARY JOINT FOR WELL LOGGING USAGE

[75] Inventors: Randy Gold; Darren E. Smith, both of Houston, Tex.

[73] Assignee: Halliburton Logging Services, Inc., Houston, Tex.

[21] Appl. No.: 217,736

[22] Filed: Jul. 11, 1988

[51] Int. Cl.⁴ .............................................. G02B 6/36
[52] U.S. Cl. .................................. 350/96.2; 350/96.18
[58] Field of Search ................. 350/96.18, 96.19, 96.2, 350/96.1

[56] References Cited

U.S. PATENT DOCUMENTS

| | | | |
|---|---|---|---|
| 4,304,460 | 12/1981 | Tanaka et al. ............... | 350/96.18 X |
| 4,398,791 | 8/1983 | Dorsey ............................ | 350/96.18 |
| 4,641,915 | 2/1987 | Asakawa et al. ................ | 350/96.18 |
| 4,725,116 | 2/1988 | Spencer et al. ............... | 350/96.18 X |

Primary Examiner—John D. Lee
Assistant Examiner—John Ngo
Attorney, Agent, or Firm—William J. Beard

[57] ABSTRACT

An optical rotary joint for use in a well logging cable is set forth in the preferred and illustrated embodiment capable of transferring two or more data streams traveling along two or more optical fiber channels. The rotary joint is constructed with a stationary portion and a coacting rotary portion. A first channel of data is delivered to an optical fiber transmitted coaxially of the stationary and rotary sides of the apparatus, transfer across the rotational plane between the two components being accomplished by opposing centrally located, concentrically arranged, coacting optical lenses. A second data channel transmitted through a second optical fiber is delivered to a lens system which converts the light into a cylinder of light coaxial with the first channel and which surrounds the optical management for the first channel. All channels other than the first channel thus are converted into coaxial hollow cylinders of light. These cylinders of light are transmitted between facing lens systems in the rotary and stationary sides of the apparatus.

15 Claims, 1 Drawing Sheet

MULTICHANNEL OPTICAL ROTARY JOINT FOR WELL LOGGING USAGE

BACKGROUND OF THE INVENTION

In recent years the development of high data rate generation well logging instruments such as multiple transducer, high frequency acoustic logging instruments and multiple channel high frequency electric logging instruments together with fast count rate nuclear well logging instruments of the gamma ray spectroscopy type in the well logging industry have generated the necessity for wider bandwidth well logging cables. A solution to the bandwidth problem in a well logging cable is to employ a cable having electrical conductors to supply power from the surface to downhole instrumentation suspended on the cable while simultaneously employing one or more optical fibers in the logging cable for transmitting high speed wide-band data from the downhole instrument to the surface.

Slip ring arrangements have been commonly used in the art of well logging to take signals from the logging cable on the rotating cable drum and conduct them into the well logging truck. If a well logging truck employing a logging cable having one or more optical fibers is similarly employed in a well logging environment, then the well logging system must be capable of also removing cable signals from the rotating cable drum from the optical fibers and supplying these signals to the well logging truck instrumention for translation and processing. Thus it is apparent that an optical analog of the typical slip joint used for translating electrical signals from the rotating cable drum into the truck is of interest in the well logging environment.

Optical rotary joints enable communication between rotating and stationary systems employing optical fibers in such fiber optic communication systems. Commercially available low loss, passive optical rotary joints for single channel communication only have been developed in the past. Two channel optical rotary joint devices have been constructed which have losses on the order of 5 db for the optical rotary joint. A primary difficulty with commercially available multi-channel optical rotary joint systems is that such systems have involved mechanically sensitive arrangements of prisms, lenses, mirrors and optical masks which makes them too delicate to employ in a well logging environment where up to 30,000 feet of well logging cable may be spooled on a large drum on the back of a well logging truck and which is utilized outdoors under extremely adverse environmental conditions and all types of weather. Thus it would be desirable to have a rugged, reliable and simple passive optical rotary joint which is suitable for use in a well logging environment.

BRIEF DESCRIPTION OF THE INVENTION

The present invention comprises a multiple channel optical rotary joint suitable for use in a well logging environment. One channel of the device can be configured much like other single channel optical rotary joints available in the prior art. A standard component in such devices is the graded index (GRIN) lens. Such a lens is basically a short piece of glass or optical fiber having a graded or changing spatial index of refraction that takes a point-like input from the optical fiber coming into it and expands this point into a larger diameter (3.0 to about 1.0 mm) collimated beam.

The second and successive channels of the device utilize at each side of the optical rotary joint an infinite focal length ring (IFLR) lens or a disk prism lens either of which has the capability of converting a single light beam into a tubular or hollow cylindrical thin wall light beam. The devices are aligned axially concentrically in the multi-channel optical rotary joint of the present invention. A plurality of such IFLR lenses or light tube forming lenses may be used in a concentric coaxial arrangement aligned about a longitudinal axis of the optical rotary joint to provide several parallel channels for separate optical fibers. Because it may prove desirable in the well logging environment to employ a logging cable having as many as three or four optical fibers, communication from the rotating cable spool to the fixed truck environment can be established through the rotary joint.

The above described system according to the concepts of the present invention may be better understood by referring to the following detailed description of the preferred embodiment thereof when taken in conjunction with the accompanying drawings in which:

BRIEF DESCRIPTION OF THE DRAWINGS

So that the manner in which the above recited features and advantages of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the drawings

FIG. 1 is a schematic drawing showing in longitudinal cross section a multi-channel optical rotational joint according to concepts of the present invention;

FIG. 2 is a cross sectional view taken at the separation point between the stationary side and the rotating side of the optical rotary joint of the present invention; and FIG. 3 is a drawing showing an alternate type of disk prism lens capable of converting a parallel beam of light into a tube of light for use in a system according to the concepts of the present invention.

DETAILED DESCRIPTION OF THE PREFERRED EMBODIMENTS

Figure 1:
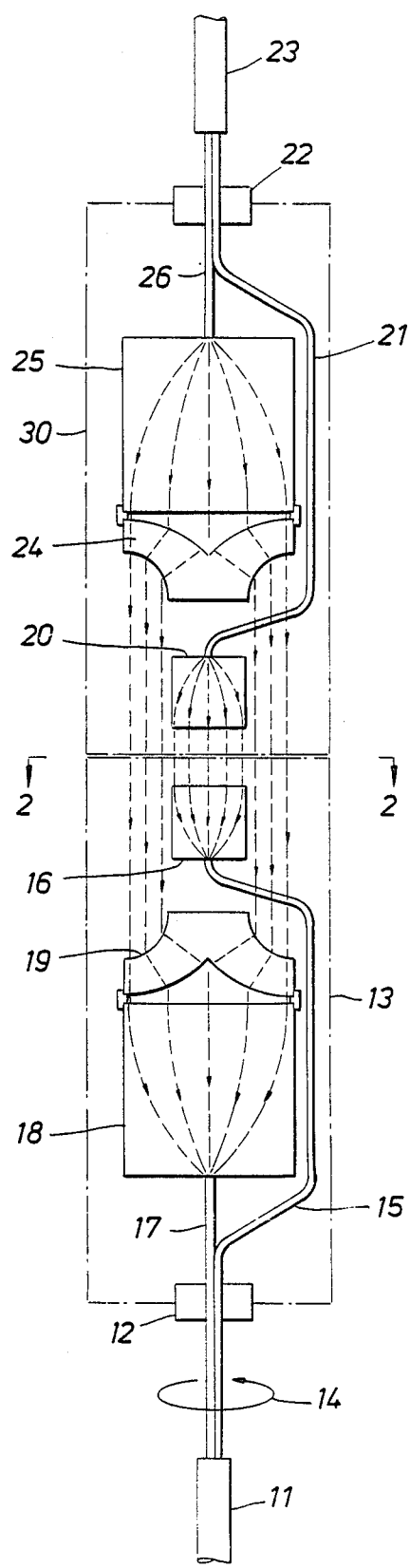

Referring initially to FIG. 1, a multi-channel optical rotary joint according to concepts of the present invention is illustrated schematically in longitudinal cross section. An input fiber optic cable 11 having two optical fibers therein is illustrated entering the rotation side of the optical rotary joint 13 via an optical connector 12, which may be a conventional optical cable connector as known in the art. The rotary motion of the rotating side 13 about its axis is indicated by the direction of the arrow 14 although details of the mechanical arrangement and pivots for accomplishing this are omitted for the sake of simplicity. A first optical fiber 15 is routed to a graded index of refraction lens or GRIN lens 16 on the rotating side of the system. A second optical fiber 17 is connected to a second, larger diameter GRIN lens 18 which in turn is optically coupled to an infinite focal length ring (IFLR) lens 19. IFLR lenses are known in the art.

On the stationary side of the multi-channel rotary joint of FIG. 1, a second, smaller diameter GRIN lens 20 is optically coupled across the rotational plane to the GRIN lens 16 of the rotating side of the system. Again, details of the optical coupling and mechanical arrangement are not illustrated for purposes of simplicity. A first output optical fiber 21 of the stationary side is connected to receive the output of the GRIN lens 20 and to conduct data via an optical connector 22 to an output optical cable 23. A second infinite focal length ring (IFLR) lens 24 is optically coupled to a second output optical fiber 26 via a second large diameter GRIN lens 25. The axis of GRIN lenses 20 and 25 is coincident with the axis of IFLR lens 24. In fact, the axes of the several lenses shown are coincident with the equipment axis as illustrated. The axis of the surrounding housing are also conveniently concentric. thus light is coupled across the rotation facing plane defined by line 2—2 of FIG. 1, into the stationary side 30 of the multi-channel rotary joint. Light from the input fiber 15 is conducted via GRIN lens 16 to GRIN lens 20 across the rotational plane in a manner conventional in single channel optical rotary joints. However, the light entering the second optical fiber 17 is diverted by the IFLR lens 19 and forms a relatively small diameter light cylinder encircling the outer edges of the GRIN lens 16 and enters IFLR lens 24 across the plane separating the fixed side 30 from the side of rotation 13. The GRIN lens 25 takes the output (a thin walled cylinder of light) produced by the IFLR lens 24 and directs it to a point for entry into the optical fiber 26 of the output cable 23 in the stationary side 30 of the system.

Figure 2:
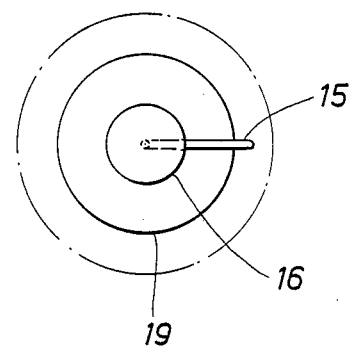

Referring now to FIG. 2, the two channel concept is illustrated in cross section along line 2—2 of FIG. 1. In FIG. 2, the view is toward the rotating side of the system. Thus the first optical fiber channel input on fiber 15 is illustrated optically coupled into the GRIN lens 16 and the optical fiber 17 (not shown) is coupled to the IFLR lens 19 of FIG. 1. Light passing along the first optical fiber channel on fiber 15 thus is passed across the separation plane (along line 2—2) of FIG. 2 in a relatively narrow beam at the center axis of the system while light entering the system from fiber 17 is focused by the lens arrangement into a ring in the plane of FIG. 2 concentric with the axis of GRIN lens 16.

It is readily apparent from this description that relatively larger diameter combinations of GRIN lenses and IFLR lenses can be used to provide more concentric cylindrical optical channels for separate optical fibers entering and exiting the system as desired.

Figure 3:
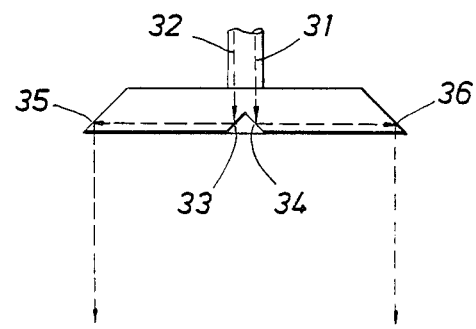

Referring now to FIG. 3, an alternative referred to herein as a disk prism to the IFLR lenses illustrated in FIGS. 1 and 2 is shown in schematic cross section. A disk comprising a truncated cone of glass having an index of refraction such that the light is totally reflected at each internal surface is illustrated. The disk arrangement thus functions internally in the nature of a prism. A parallel beam of light is shown entering from the left side of the disk prism lens along the rays 31 and 32. The parallel beam is thus totally reflected from the interior surfaces of the glass at 33 and 34 respectively as illustrated and is redirected at right angles as shown. A second relection of each ray occurs at the surfaces 35 and 26 which are parallel to surfaces 33 and 34 respectively. These surfaces direct the beams or rays 31 and 32 out of the system of the lens in the illustrated direction of the arrows. The effect of this disk prism lens is thus to convert a parallel beam of light such as that from a GRIN lens 18 and to form it into a relatively thin walled cylindrical light tube in the manner of the IFLR lenses in FIG. 1. However, the disk prism lens of FIG. 3 is easier to construct than an IFLR lens because it has planar surfaces rather than complex curves. The output beam diameter of such a lens is independent of the input beam unlike the IFLR lens which has the cusp like surfaces as shown in FIG. 1.

An additional feature of the disk prism lens of FIG. 3 is that optical phase is maintained in the input and output beam since only reflections occur within this lens. A graded index lens such as IFLR lenses 19 and 24 as shown in FIG. 1 does not necessarily preserve the optical phase due to the graded index of refraction of these lenses.

A multi-channel optical rotary joint is provided in the present invention which allows rotational motion about a single axis in a simple rigid configuration. Optical losses in such a system are minimal where the primary loss contribution in the single channel is related primarily to how well the rotating and stationary sides of the system can be aligned and how well rotational variations can be controlled. It will be appreciated by those skilled in the art that the embodiment shown in FIG. 1 embodies only the fundamental concept of the multi-channel optical rotary joint of the present invention. Other variations may be possible such as routing fibers through the lenses themselves, using pigtail leads in place of connectors, and using different collimating techniques in place of the GRIN lenses illustrated in FIG. 1.

Such changes and modifications may be made apparent to those skilled in the art by the foregoing description. It is the aim of the appended claims to cover all such changes and modifications which are made apparent by reference to the above descriptions.

What is claimed is:

1. A method of transmitting two or more optical channels in a multi-channel fiber optic data transmission system across a rotary joint, the method comprising the steps of:
    (a) at a coacting rotary joint including a stationary side and a rotating side, connecting a first channel optical fiber with a pair of coaxially concentric facing lens systems which transmit light between the rotary and stationary sides thereof; and
    (b) converting the light beam from a second channel in the optical fiber transmission system into a hollow cylinder of light concentric about the lens system for the first optical channel wherein the conversion is accomplished in opposing and coacting concentrically arranged optical lens systems aligned ot transmit light between the stationary and rotary sides of the rotary joint.

2. A multi-channel optical rotary joint for transmission of data transmitted along a well logging cable wherein the logging cable includes at least two optical fiber channels comprising:
    (a) a rotary joint formed of coacting stationary and rotary halves aligned with one another and adapted for connection in a logging cable;
    (b) a first optical fiber transmission channel having:
        (1) a stationary lens;
        (2) an opposing rotary lens; and
        (3) means for aligning said stationary and rotary lenses coaxial of the rotary joint and optically coupled with one another for transmission between the rotary and stationary lens; and (c) a second optical fiber channel having:
   (1) a first lens system in the stationary side of the rotary joint;
   (2) a second optical lens system in the rotary side of the rotary joint;
   (3) wherein said first and second lens systems are arranged in coacting facing relationship to transmit optical data between the stationary and rotary sides of the optical joint; and
   (4) wherein said first and second lens systems form a hollow cylinder of light which is concentric about the lens system of said first optical fiber channel.

3. A multi-channel optical rotary joint for use with well logging equipment and a fiber optic well logging cable having a plurality of optical fiber channels herein, comprising stationary and rotating sides of said optical rotary joint adapted for independent relative rotary movement about a common axis and separated by a plane of separation, each of said sides being symmetric about said plane of separation and having:
   (a) means for coupling a plurality of optical fibers into each of said sides;
   (b) means for optically coupling light from a first optical fiber substantially along and coincident with said common rotational axis;
   (c) means for optically coupling light from at least a second optical fiber into a thin walled cylinder substantially coaxial with said common rotational axis and directed across said plane of separation; and,
   (d) wherein the symmetric arrangement of optical elements on either side of said plane of separation is such as to substantially be the inverse of that on the symmetric side opposite the plane of separation.

4. The system of claim 3 wherein said symmetric arrangement of optical elements on each of said sides includes a graded index of refraction (GRIN) lens.

5. The system of claim 4 wherein said GRIN lens has a longitudinal axis disposed coincident with the axis of rotation of said relative rotary movement.

6. The system of claim 5 wherein said symmetric arrangement of optical elements further includes on each of said sides an infinite focal length ring (IFLR) lens.

7. The system of claim 6 wherein said IFLR lens has a central longitudinal axis disposed coincident with the axis of rotation of said relative rotary movement.

8. The system of claim 5 wherein said symmetric arrangement of optical elements further includes a disk prism lens on each of said sides.

9. The system of claim 8 wherein said disk prism lens has a central longitudinal axis disposed coincident with the axis of rotation of said relative rotary movement.

10. A multi-channel optical rotary joint for use in a well logging environment for coupling optical signals from a fiber optic logging cable spooled on a rotary drum onto a logging truck, comprising:
   an optical rotary joint having symmetrically arranged stationary and rotary sides adapted for rotary movement relative to each other about a single common axis of rotation, each of said stationary and rotary sids having a plurality of optical components thereon including on each side a lens means for rendering light from a narrow parallel beam into a larger parallel beam, and arranged to transmit light across a plane of separation between said stationary and rotary sides in such a manner that, in said plane of separation, the cross section of the path of said light traversing said plane comprises a series of concentric closed curves, one for each of said multiple channels.

11. The system of claim 10 wherein said series of concentric closed curves comprise a series of concentrific elipses.

12. The system of claim 11 wherein said series of concentric ellipses comprises a series of concentric circles.

13. The system of claim 10 wherein said plurality of optical components further includes on each of said sides a second lens means for forming a solid cross section beam of parallel light rays into a hollow cylindrical cross section beam of parallel light rays.

14. The system of claim 13 wherein said second lens means comprises an infinite focal length ring lens.

15. The system of claim 13 wherein said second lens means comprises a disk prism lens.

* * * * *